E. BERLINER & H. D. CHAPMAN.
VALVE FOR GAS ENGINES.
APPLICATION FILED MAR. 21, 1912.
1,139,837.
Patented May 18, 1915.
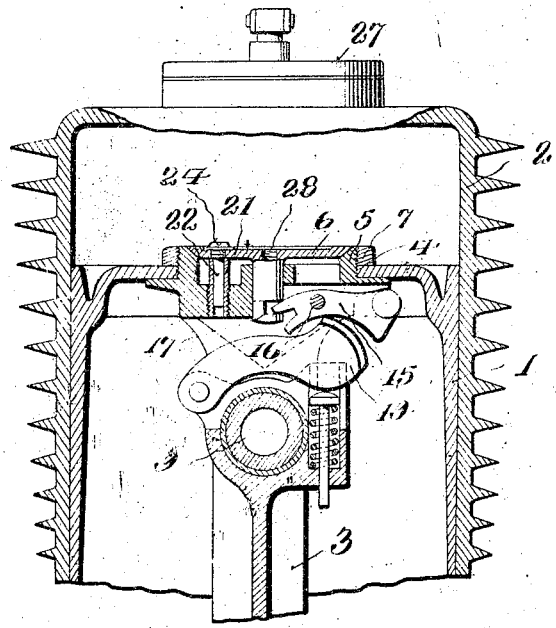
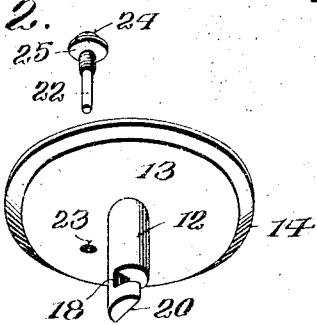
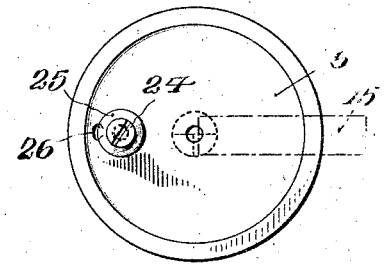
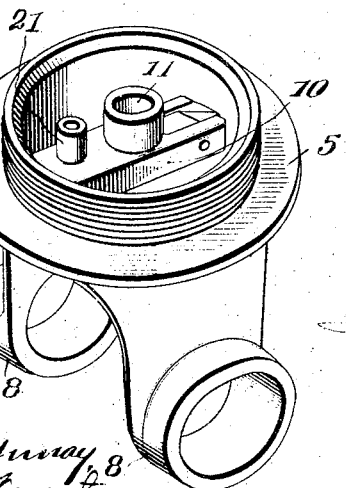
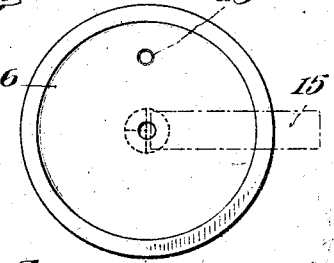
Inventors
Emile Berliner
Howard D. Chapman
By
Sturtevant & Mason
Attorneys
Witnesses

UNITED STATES PATENT OFFICE.

EMILE BERLINER AND HOWARD D. CHAPMAN, OF WASHINGTON, DISTRICT OF COLUMBIA, ASSIGNORS TO THE GYRO MOTOR COMPANY, OF WASHINGTON, DISTRICT OF COLUMBIA, A CORPORATION OF DELAWARE.

VALVE FOR GAS-ENGINES.

1,139,837.  Specification of Letters Patent.  Patented May 18, 1915.

Application filed March 21, 1912. Serial No. 685,275.

*To all whom it may concern:*

Be it known that we, EMILE BERLINER and HOWARD D. CHAPMAN, citizens of the United States, residing at Washington, in the District of Columbia, have invented certain new and useful Improvements in Valves for Gas-Engines, of which the following is a description, reference being had to the accompanying drawing and to the figures of reference marked thereon.

The invention relates to new and useful improvements in valves for internal combustion engines, and more especially to the manner of detaching the valve proper from its operating or seating mechanism.

An object of the invention is to provide a valve construction wherein the valve proper may be readily detached from the operating devices therefor without detaching the operating devices from the valve seat, or in any other way disturbing the valve-operating mechanism.

A further object of the invention is to provide a valve of the above character with a locking device for holding the same in operative engagement with the devices which move the valve relative to its seat, which locking devices are so constructed as not to interfere in any way with the movements of the valve toward and from its seat.

A further object of the invention is to provide a locking device of the above character with means whereby said locking device may be held from turning through the rapid vibration of the parts in which it is seated.

These and other objects will in part be obvious, and will in part be hereinafter more fully described.

In the drawings which show by way of illustration one embodiment of the invention, Figure 1 is a sectional view through a cylinder showing an intake valve located in the piston head with the improvements applied thereto; Fig. 2 is a perspective view, showing the valve seat with the valve separated therefrom; also the locking pin for holding the parts assembled; Fig. 3 is a detail of the valve, showing the parts in operative position; Fig. 4 is a similar view, showing the valve rotated so as to release the same from the operating parts; and Fig. 5 is a detail showing the manner of holding the pin from turning, so as to release the valve.

As herein shown, the invention is applied to a valve which is located in the head of a piston 1, which reciprocates relative to a cylinder 2. The piston head is connected to a connecting rod 3. The piston has a central opening 4 therein, through which extends a collar 5 having a valve seat 6 thereon. This collar is threaded and held to the piston head by a locking ring 7. Brackets 8, 8, are carried by the collar forming the seat for the valve, and these brackets form a bearing for a pin 9, which joins the connecting rod to the piston 1.

Extending across the collar 5 forming the seat for the valve is a cross bar 10. This cross bar has a central sleeve 11, which receives the stem 12 of a valve 13. The valve 13 at its outer end is tapered as at 14, so as to fit the seat 6 in the ring 5. The cross bar 10 is cut away to receive a lever 15, which is pivoted at 16 to said cross bar. The outer end of the lever is provided with a forked end 17.

The valve stem 12 has a notch 18 extending across the same, which receives one of the forks 17 of the lever 15. It will be apparent, therefore, that any movement of the lever 15 will be imparted to the valve, so as to move the same toward and from the valve seat; also any movement of the valve will be imparted to the lever 15. In other words, the lever 15 is positively connected with the valve, so as to move with the same as it moves toward and from its seat. This lever 15 is controlled and operated by a centrifugally controlled arm 19, as fully shown and described in the patent granted to Robert S. Moore and James L. Simmons, No. 1,004,457, September 26th, 1911, and, therefore, further description of the operating means for the valve will not be necessary. As a matter of fact, the present operating means is merely shown as being typical of a positively actuating means for the valve.

It often occurs that valves of this character wear and need replacing, and an object of the present invention is to provide means whereby the valve may be readily detached from its operating mechanism and removed, without taking down the cylinder or taking the piston head out of the cylinder and separating the connecting rod and other operating parts from the piston. To this end, the valve stem is cut away on one side, as at 20 (see Fig. 2), so that the lower wall of the notch 18 extends only half way across the valve stem. The forked end 17 of the lever 15 extends only to a central plane passing through the valve stem. It will be apparent, therefore, that if the valve stem 12 is rotated through an arc of 90°, the flat side of the end of the stem, or the notched part 20, will be presented to the end of the lever 15, and, therefore, the forked end 17 will be withdrawn from the notch 18, so that the lever may be lifted from its seat.

In Fig. 3 is shown the valve in its normal operating position, and as in engagement with the operating lever. In Fig. 4 the valve is shown as turned to an arc of 90°, and in position to be removed from its valve seat as it is disconnected from the operating lever.

In order to hold the valve in proper operating relation to the lever 15, the cross bar 10 is formed with a threaded opening, in which is screwed a sleeve 21. A pin 22 passes through an opening 23 in the valve, and freely engages said sleeve 21. When this pin 22 is in place, the valve cannot turn on its seat, but is free to move toward and from its seat. The pin 22 is carried by a threaded head, which screws into the valve. The head of the pin is slotted as at 24 for the ordinary tool, whereby the pin may be turned. Said head 24 is formed as herein shown, with an outwardly extending flange 25, which is integral with the head of the pin. The valve in its upper face is provided with a shallow recess 26. The pin is screwed into the valve, and when the head rests flat against the outer face of the valve, said flange 25 is indented so as to cause a projecting part thereof to extend into the recess 26, and this projecting part in the recess will prevent the pin from turning in its socket, and thereby hold said pin from movement due to the vibration of the parts.

In the outer end of the cylinder, as herein shown, is an exhaust valve 27, which may be secured to the cylinder in any well known way. When it is desired to remove and replace the valve, the exhaust valve fitting 27 is removed, so as to give access to the end of the cylinder. The pin 22 which locks the valve from rotating on its seat is removed, after which a suitable threaded implement may be inserted into a threaded hole 28 centrally of the valve and the valve turned on its seat through an arc of 90°. This turning of the valve will bring the notch 18 out of engagement with the end of the operating lever 15, and the flat side or cut away part 20 of the valve stem into such position that the valve may be lifted from its seat and disconnected from the operating lever 15. The valve is replaced by inserting the same through the opening for the exhaust valve, and after it is placed on the valve seat it is given a quarter turn, and the locking pin inserted to hold it from further turning on the seat.

While we have shown our improvements as applied to the intake valve located in the piston head of a cylinder, it is obvious that said improvements may be applied to valves of various character used in connection with internal combustion engines. The invention, however, is especially adapted to a valve of this character located in the piston head, as it renders the valve accessible for removal, without requiring the taking out of the piston head, or the removal of the cylinder.

It is also obvious that minor changes in the details of construction and the arrangement of parts may be made, without departing from the spirit of the invention, as set forth in the appended claims.

Having thus described our invention, what we claim as new and desire to secure by Letters Patent, is:—

1. A gas engine including in combination a valve seat, a valve for engaging said seat, means connected to the valve for operating the same, the connection between the valve and the operating means being so constructed that said valve may be disconnected from said operating means by a rotation of the valve on its seat.

2. A gas engine including in combination a valve seat, a valve for engaging said seat, means connected to the valve for operating the same, the connection between the valve and the operating means being so constructed that said valve may be disconnected from said operating means by a rotation of the valve on its seat, and means for locking the valve against rotation on its seat, said locking means being constructed to permit the valve to move toward and from its seat.

3. A gas engine including in combination a valve seat, a valve for engaging said seat, means connected to the valve for operating the same, the connection between the valve and the operating means being so constructed that said valve may be disconnected from said operating means by a rotation of the valve on its seat, a locking pin for preventing the valve from turning on its seat, and means for holding said pin in said valve.

4. A gas engine including in combination, a valve seat, a valve for engaging said seat, a stem carried by the valve, said stem having a notch at its lower end and the side of the stem adjacent the notch cut away, an operating lever for the valve having an end adapted to engage said notch and said cut away portion, whereby when said valve is rotated, said stem may be disconnected from said lever.

5. A gas engine including in combination, a valve seat, a valve for engaging said seat, a stem carried by the valve, said stem having a notch at its lower end and the side of the stem adjacent the notch cut away, an operating lever for the valve having an end adapted to engage said notch and said cut away portion, whereby when said valve is rotated, said stem may be disconnected from said lever, and means for locking said valve from rotation on its seat.

6. A gas engine including in combination, a valve seat, a valve for engaging said seat, a stem carried by the valve, said stem having a notch at its lower end and the side of the stem adjacent the notch cut away, an operating lever for the valve having an end adapted to engage said notch and said cut away portion, whereby when said valve is rotated said stem may be disconnected from said lever, a sleeve carried by the valve seat, and a pin detachably carried by the valve and coöperating with said sleeve for locking the valve from rotation on its seat, said pin freely engaging said sleeve whereby the valve is permitted to move toward and from its seat.

7. A gas engine including in combination, a valve seat, a valve for engaging said seat, a stem carried by the valve, said stem having a notch at its lower end and the side of the stem adjacent the notch cut away, an operating lever for the valve having an end adapted to engage said notch and said cut away portion, whereby when said valve is rotated said stem may be disconnected from said lever, a sleeve carried by said valve seat, a pin slidingly engaging said sleeve and having a head threaded into the valve, the head of said pin having a flange adapted to be indented into a recess in the outer face of the valve, whereby said pin is held from turning in its threaded seat.

In testimony whereof, we affix our signatures, in the presence of two witnesses.

EMILE BERLINER.
HOWARD D. CHAPMAN.

Witnesses:
ELIZABETH SMITH,
ROBERT STUNZ.